Nov. 26, 1929. J. W. WELSH 1,736,952
SPECTACLE TEMPLE AND METHOD OF MAKING THE SAME
Filed Dec. 1, 1923
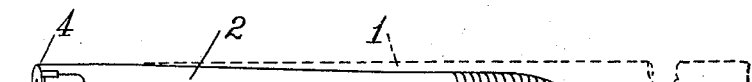
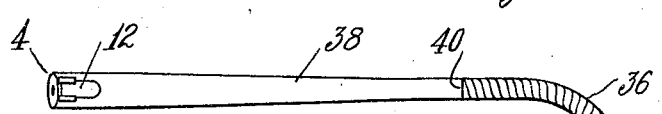
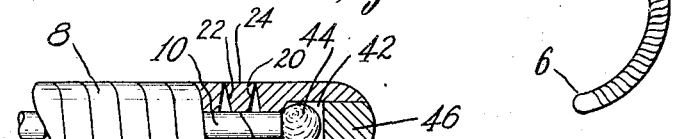
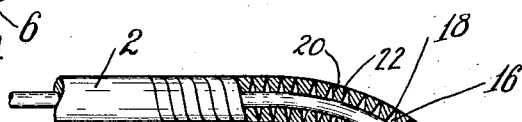
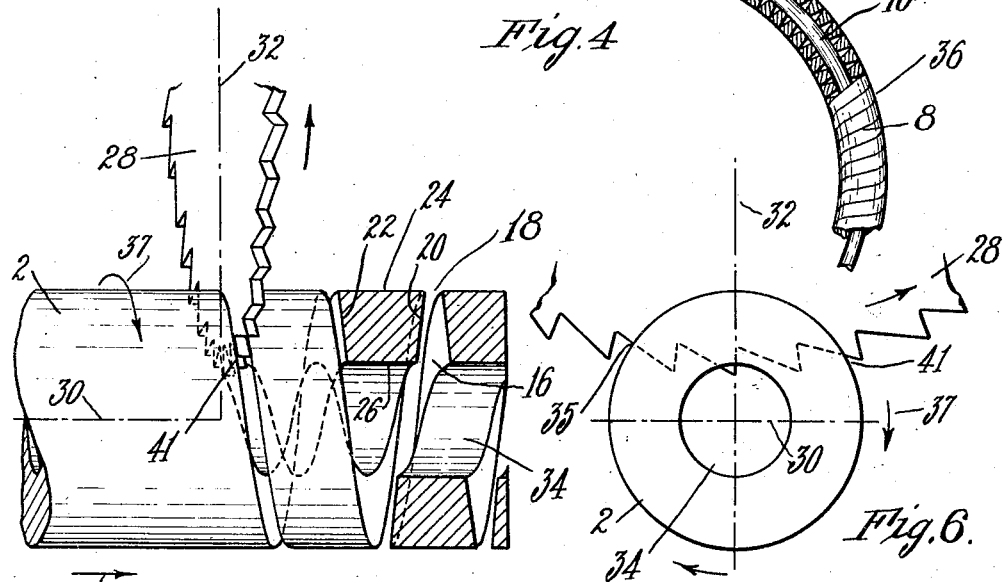
Inventor:—
James W. Welsh
by David Rines
Attorney Patented Nov. 26, 1929

1,736,952

UNITED STATES PATENT OFFICE

JAMES W. WELSH, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK

SPECTACLE TEMPLE AND METHOD OF MAKING THE SAME

Application filed December 1, 1923. Serial No. 677,949.

The present invention, while possessing features of more general usefulness, is more particularly related to spectacle temples of the so-called "cable" type and to methods of making the same.

Cable temples usually comprise one or more strands, wound in more or less helical form about a core, to render the temple flexible. In the case of metal temples, the strands are very thin, and they may therefore be wound very close together. In the case of the much larger and heavier non-metallic temples, the helical coils are much thicker, and they can not be wound so compactly. At the rear portions of such temples, bent into ear-hook or other temple shapes, the strands visibly separate on the convex sides of the curves of the temples, providing dirt- and other debris-collecting spots, besides rendering the temple unsightly.

One object of the present invention is to improve upon temples of the above-described character, to the end that a better, more efficient and less expensive article may be produced. Other objects will be made clear in the course of the subjoined description, taken in connection with the accompanying drawings, and the scope of the invention will be particularly set forth in the appended claims.

In the accompanying drawings, Fig. 1 is an elevation of a cable temple constructed according to a preferred embodiment of the present invention, showing the tube from which it is originally made in dotted lines; Fig. 2 is a similar view of a modification; Fig. 3 is a fragmentary enlarged elevation, partly in longitudinal section, of the tip of the preferred temple; Fig. 4 is a similar fragmentary enlarged elevation, partly in section, and with parts broken away, of the rear portion of the preferred temple; and Figs. 5 and 6 are respectively a side and an end view upon a still further enlarged scale, illustrating a preferred method of manufacture.

In the manufacture of cable temples comprising non-metallic material, it is advantageous to start with a cylindrical tube 1 of non-metallic material, like zylonite, celluloid and the like, and to cut away the material on the outside of a portion of the tube to reduce the thickness of the said portion. The cut-away portion is indicated in Fig. 1, the dotted lines showing the original dimensions of the tube 1, and the full lines indicating the final dimensions. It is preferred, as shown, to have the finally shaped tube, indicated by the numeral 2, taper from the larger end 4 towards the end 6 of smaller diameter. This tapered tube 2, though flexible, is not sufficiently so in the form shown in Fig. 1 to produce, when the tapered end is bent into the shape of a hook, as shown in Fig. 1, a temple that may properly be called flexible. The portion of smaller diameter of the tube 2 is therefore cut into the form of a helix, as shown at 8, which renders it very yielding. As non-metallic material of the above-described character is resilient, the non-metallic material thus cut is maintained in helical form by its own resiliency. A metal reinforcing rod or core 10 is now inserted in the bore of the tube, and is fixed therein in any well known manner. The rod 10 may be of the same material of which flexible metal temples are made, or of any other suitable material. The helical portion 8 of the tube 2 will thus become stiffened, but it will have the same degree of flexibility as the metal rod 10. The tapered, helically cut portion of the tube 2, with the metal rod 10 inserted therein, is preferably then bent into a hook or temple shape, as shown in Figs. 1 and 4, though it is within the scope of the invention to assemble the parts after bending. The customary hinge plate 12 is added at the forward end 4 of the tube, completing the temple. Unsightly dirt-collecting cracks have a tendency to appear at the convex sides of the curves of temples so produced.

A feature of the present invention resides in making the helical cut on the inside of the tube, as at 16, wider than on the outside of the tube, as at 18. This causes the outer portions of the successively coiled parts of the helix to come close together, as is clearly shown in Fig. 4, even along the convex sides of the curves of the temple, thereby eliminating the above-mentioned cracks. By reason of the wider cuts at 16, the cross-sectional contour of the element of which the helix is formed is provided with one or more sloping sides 20 and 22, and with a larger face 24 on the outside of the helix than the face 26 on the inside of the helix. The said element is therefore trapezoidal or triangular in cross-section, depending upon the size of the face 26. The term "trapezoidal" will, for brevity, be employed in the specification and the claims in this broad sense.

The helical cutting may be effected in many ways without departing from the scope of the present invention. It is preferred to employ a rotary saw 28 the plane of which is inclined to the axis 30 of the tube 2, and so positioned that a diameter 32 of the saw is substantially at right angles to the axis 30. The saw 28 is caused to extend into the bore 34 of the tube 2, but preferably not so far as to intersect the axis 30. The distance that the saw extends into the bore 34 will determine the shape of the cross-sectional contour bounded by the faces 20, 22, 24 and 26 and the width and shape of the cut 16, 18. If the saw 28 were rotated, and the tube 2 held stationary, it is obvious that a parallel-sided slot only would be cut in the tube 2. This parallel-sided slot is shown in the making in Fig. 5, the slot being shown occupied by the lower portion of the saw. The walls of the parallel-sided slot are inclined to a plane at right angles to the axis 30. It will be readily understood that the inclination of such plane causes the slant of the face 22, and that this slant is produced by the saw at the position where the saw first enters the tube 2, at 35, Fig. 6. The face 20 on the other side of the slot is at this time parallel to the face 22. During the feeding of the tube 2 past the saw, with a combined rotary and longitudinal movement, as indicated by the arrows 37 and 39, the slot is caused to assume the form of a helix. By the time that the face 20 has reached the position indicated at 41, the saw has cut out material enough to produce a slant in the face 20 opposite to the slant in the face 22. The forward movement of the tube 2 prevents the saw modifying the slant of the face 22. The resulting trapezoidal-shaped cross-sectional figure has already been alluded to. The difference in the widths of the cuts 16 and 18 on the inside and the outside of the tube, respectively, is appreciable when the material of the tube is of substantial thickness.

According to the modification shown in Fig. 2, the non-metallic portion of the temple is constituted of two parts, one a helically cut tube 36, and the other an uncut tube 38, both mounted on a preferably previously bent reinforcing rod, and the hinge plate 12 being provided on the uncut tube 38. The helically cut tube 36 may be secured to the uncut tube 38 at 40 with cement, or in any other desired way.

As shown in Figs. 1, 2 and 3, the rear end or tip 6 of the helically cut tube 8 or the helically cut tube 36 is left intact, except that it is provided with a recess 42 of larger diameter than the bore 34 of the tube. The rod 10 is provided with an enlarged terminal ball head 44 that is seated in the recess. The parts of the helical element can be very snugly pulled together by this construction. A plug 46 is mounted in the recess 42 to conceal the ball head 44. This feature is not claimed herein, as it constitutes the subject matter of a copending application, Serial No. 683,437, filed December 29, 1923.

It will be understood that the invention is not restricted to the exact embodiments thereof that are illustrated and described herein, but that many other modifications will readily occur to persons skilled in the art, and all such are considered to fall within the spirit and scope of the invention, as defined in the appended claims.

What is claimed is:

1. An article of the class described comprising a non-metallic resilient element maintained in the form of a three-dimensional coil by its resiliency, the element being non-rectangular in cross section.

2. An article of the class described comprising a non-metallic resilient element maintained in the form of a three-dimensional coil by its resiliency, the element being trapezoidal in cross section.

3. An article of the class described comprising a non-metallic resilient element maintained in the form of a helix by its resiliency, the cross-sectional figure of the element having a larger face on the outside of the helix than on the inside of the helix.

4. An article of the class described comprising a non-metallic resilient element maintained in the form of a helix by its resiliency, the element being trapezoidal in cross section, with the base of the trapezoid on the outside of the helix.

5. An article of the class described comprising a non-metallic element in the form of a helix, the element being trapezoidal in cross section, with the base of the trapezoid on the outside of the helix, and a metal element within the helix.

6. A spectacle temple comprising a non-metallic resilient element maintained in the form of a three-dimensional coil by its resiliency, the cross-sectional figure of the element having a larger face on the outside of the coil than on the inside of the coil, the coil being bent into the shape of a temple, and the temple being provided with a hinge member.

7. A spectacle temple comprising a non-metallic resilient element maintained in the form of a three-dimensional coil by its resiliency, the element being trapezoidal in cross section, with the base of the trapezoid on the outside of the coil, the coil being bent into the shape of a temple, and the temple being provided with a hinge member.

8. A spectacle temple comprising a rod and non-metallic, resilient parts arranged in end-to-end contact on the rod, the parts being closer together farther from the rod than nearer to the rod and being held together by their own resiliency.

9. A spectacle temple comprising a non-metallic resilient element maintained in the form of a helix by its resiliency, the element being trapezoidal in cross section, with the base of the trapezoid on the outside of the helix, a metal element in the helix, the helix with the metal element therein being bent into the shape of a temple, and the temple being provided with a hinge member.

10. A spectacle temple comprising a non-metallic resilient element maintained in the form of a helix by its resiliency, the element being trapezoidal in cross section, with the base of the trapezoid on the outside of the helix, a metal element in the helix, the helix with the metal element therein being bent into the shape of a temple, and a member provided with a hinge member secured to the helix and the metal element.

11. A spectacle temple comprising a tube constituted of resilient, non-metallic material a portion of which is cut into the form of a helix, the cut produced on the inside of the tube being wider than the cut produced on the outside of the tube, a metal element within the tube, the cut portion of the tube with the metal element therein being bent into the shape of a temple, and the uncut portion of the tube being provided with a hinge member.

12. In construction for eyeglass temple bars, a tubular member having formed therein and extending about the axis thereof a slot that, when considered with respect to its longitudinal direction, is of non-uniform width.

13. In construction for eyeglass temple bars, a tubular member having formed therein and extending about the axis thereof a slot having a width that is different at different distances from said axis, the slot extending through both the inner and outer walls of the tubular member.

14. In construction for eyeglass temple bars, a tubular member having formed therein a spiral slot encircling said member a plurality of times, the portions of said slot being of different width at different distances from the axis of the member, the slot extending through both the inner and outer walls of the tubular member.

15. In construction for eyeglass temple bars, a tubular member comprising a spirally coiled strip of celluloid gradually varying in width between a maximum and a minimum at different distances from the axis of the member, the successive coils of the spirally coiled strip being separated by a slot extending through both the inner and outer walls of the tubular member.

16. A spectacle temple comprising a celluloid tube cut through both the inner and outer walls of the tube into the form of a helix, the portions of the slot on the inside of the tube being wider than other portions of the slot.

17. A spectacle temple comprising a celluloid tube cut through both the inner and outer walls of the tube into the form of a helix, the helix being trapezoidal in cross section.

18. A spectacle temple comprising a celluloid tube a portion of which is slotted into the form of a helix, the portion of the slot on the inside of the tube being wider than other portions of the slot, a metal core in the tube, the slotted portion of the tube and the metal core therein being bent into the shape of a temple, and the uncut portion of the tube being substantially straight.

19. In construction for eyeglass temple bars, a tubular member having formed therein and extending about the axis thereof a slot of non-uniform width, the slot extending through both the inner and outer walls of the tubular member.

20. In construction for eyeglass temple bars, a tubular member comprising a spirally coiled strip of celluloid, the cross sectional width of the celluloid varying in a direction at right angles to the axis of the member.

21. A spectacle temple comprising a celluloid tube slotted into the form of a helix, the slot being of non-uniform width and extending through both the inner and outer walls of the tubular member.

22. A spectacle temple comprising a celluloid tube cut through both the inner and outer walls of the tube into the form of a helix, the helix being trapezoidal in cross section, with the bases of the trapezoid on the ouside and the inside of the cut tube and the sides of the trapezoid being substantially straight lines inclined to the axis of the tube, and a metal core in the helix, the helix and the metal core being bent into the shape of a temple.

23. The method of making an article of the class described that comprises cutting into a tube with a plane cutter the plane of which is inclined to the axis of the tube, and relatively moving the tube and the cutter with a combined relative movement longitudinally of the said axis and rotatably about the said axis, the material of the tube being of substantial thickness, whereby the cut produced on the inside of the tube is wider than the cut produced on the outside of the tube.

24. The method of making an article of the class described that comprises cutting into a tube with a rotary cutter the plane of rotation of which is inclined to the axis of the tube and that is so positioned that the cutter extends into the bore of the tube, rotating the cutter in the said plane about its axis of rotation, and relatively moving the tube and the cutter during the rotation of the cutter with a combined relative movement longitudinally of the said axis of the tube and rotatably about the said axis of the tube, the material of the tube being of substantial thickness, whereby the cut produced on the inside of the tube is wider than the cut produced on the outside of the tube.

25. The method of making an article of the class described that comprises cutting into a cylindrical non-metallic tube, the material of which is of substantial thickness, with a rotary cutter the plane of rotation of which is inclined to the axis of the tube and that is so positioned that a diameter of the cutter is substantially at right angles to the said axis and that the cutter extends into the bore of the tube without intersecting the said axis, rotating the cutter in the said plane about its axis of rotation, and moving the tube during the rotation of the cutter with a combined movement longitudinally of the said axis of the tube and rotatably about the said axis of the tube, whereby the cut produced on the inside of the tube is wider than the cut produced on the outside of the tube.

26. The method of making a spectacle temple that comprises cutting into a tube with a plane cutter the plane of which is inclined to the axis of the tube, relatively moving the tube and the cutter with a combined relative movement longitudinally of the said axis and rotatably about the said axis, the material of the tube being of substantial thickness, whereby the cut produced on the inside of the tube is wider than the cut produced on the outside of the tube, and bending the rear portion of the tube into the shape of a temple, whereby the said rear portion of the temple is rendered flexible.

27. The method of making a spectacle temple that comprises cutting into a tube with a plane cutter the plane of which is inclined to the axis of the tube, relatively moving the tube and the cutter with a combined relative movement longitudinally of the said axis and rotatably about the said axis, the material of the tube being of substantial thickness, whereby the cut produced on the inside of the tube is wider than the cut produced on the outside of the tube, bending the rear portion of the tube into the shape of a temple, whereby the said rear portion of the temple is rendered flexible, and securing the tube at its forward end to a member provided with a hinge member.

28. The method of making a spectacle temple that comprises cutting into a tube with a plane cutter the plane of which is inclined to the axis of the tube, relatively moving the tube and the cutter with a combined relative movement longitudinally of the said axis and rotatably about the said axis until a portion only of the tube has been provided with a helical cut, the material of the tube being of substantial thickness, whereby the cut produced on the inside of the tube is wider than the cut produced on the outside of the tube, bending the cut portion of the tube into the shape of a temple, and providing the uncut portion of the tube with a hinge member.

29. The method of making a spectacle temple that comprises cutting into a tube with a plane cutter the plane of which is inclined to the axis of the tube, relatively moving the tube and the cutter with a combined relative movement longitudinally of the said axis and rotatably about the said axis until a portion only of the tube has been provided with a helical cut, the material of the tube being of substantial thickness, whereby the cut produced on the inside of the tube is wider than the cut produced on the outside of the tube, bending the cut portion of the tube into the shape of a temple, and providing the tube with a reinforcing rod.

30. The herein described art of making eyeglass temple bars which consists in forming a tubular member of celluloid and removing from said member a spiral portion of varying width.

31. The herein described art of making eyeglass temple bars which consists in forming a tubular member of celluloid and removing material therefrom in the path of a spiral, the width of material being removed being different at different distances from the axis.

32. The method of making spectacle temples that comprises helically slotting a celluloid tube with a slot of varying width, portions of the slot on the inside of the tube being wider than other portions of the slot, and inserting a metal core in the slotted tube.

33. The method of making a spectacle temple that comprises helically slotting a celluloid tube with a slot of non-uniform width so that portions of the slot on the inside of the tube are wider than other portions of the slot, and inserting a flexible, metal core in the tube.

34. The method of making an article of the class described that comprises cutting into a tube with a rotary cutter the plane of rotation of which is inclined to the axis of the tube and that is so positioned that the cutter extends into the bore of the tube without intersecting the said axis, rotating the cutter in the said plane about its axis of rotation, and relatively moving the tube and the cutter during the rotation of the cutter with a combined relative movement longitudinally of the said axis of the tube and rotatably about the said axis of the tube.

In testimony whereof, I have hereunto subscribed my name this 27th day of November, 1923.

JAMES W. WELSH.